(12) United States Patent
Owens, Jr.

(10) Patent No.: US 8,363,905 B2
(45) Date of Patent: Jan. 29, 2013

(54) AUTOMATED IMAGE ANALYSIS OF AN ORGANIC POLARIZED OBJECT

(75) Inventor: Kenneth Dewane Owens, Jr., Eureka, CA (US)

(73) Assignee: Cognisense Labs, Inc., Eureka, CA (US)

( * ) Notice: Subject to any disclaimer, the term of this patent is extended or adjusted under 35 U.S.C. 154(b) by 366 days.

(21) Appl. No.: 12/840,334

(22) Filed: Jul. 21, 2010

(65) Prior Publication Data

US 2012/0020531 A1    Jan. 26, 2012

(51) Int. Cl.
*G06K 9/00* (2006.01)
(52) U.S. Cl. .................................. 382/110; 348/135
(58) Field of Classification Search .............. 382/100, 382/103, 110, 153, 154, 155, 159, 181, 190, 382/195, 203, 206, 286, 291; 348/92, 135, 348/169–172
See application file for complete search history.

(56) References Cited

U.S. PATENT DOCUMENTS

| | | | |
|---|---|---|---|
| 5,321,764 A * | 6/1994 | Cullen et al. ................. | 382/110 |
| 5,864,984 A * | 2/1999 | McNertney ................. | 47/58.1 R |
| 6,236,739 B1 * | 5/2001 | Conrad ........................ | 382/110 |
| 6,882,740 B1 * | 4/2005 | McDonald et al. ........... | 382/110 |
| 7,372,978 B2 * | 5/2008 | McDonald et al. ........... | 382/110 |
| 7,433,059 B2 * | 10/2008 | van der Knijff et al. ...... | 356/614 |
| 8,189,901 B2 * | 5/2012 | Modiano et al. .............. | 382/141 |
| 2004/0141641 A1 * | 7/2004 | McDonald et al. ........... | 382/159 |
| 2005/0226465 A1 * | 10/2005 | Fujita et al. .................. | 382/110 |

* cited by examiner

*Primary Examiner* — Anand Bhatnagar
(74) *Attorney, Agent, or Firm* — Raj Abhyanker, P.C.

(57) ABSTRACT

In one embodiment, a method includes capturing an image of a first organic polarized object using an image capture device. The method also includes collecting a first image data of the first organic polarized object. The method further includes algorithmically calculating a first dimension data based on the first image data. The method further includes generating a first data table of the first dimension data. The method also includes forming a training data set using the first data table. The method also includes computing high vote count data for second organic polarized object using the training data and second dimension data sets to identify precise shape, size, location and orientation. The method further includes calibrating coordinate systems of a robotic end effector with an image capture device and commanding the robotic end effector to pick up and place the second organic polarized object in a precise location and orientation.

20 Claims, 13 Drawing Sheets

AUTOMATED IMAGE ANALYSIS OF AN ORGANIC POLARIZED OBJECT

FIELD OF TECHNOLOGY

This disclosure relates generally to the technical field of image processing for inventory management and, in one embodiment, to an automated image analysis of an organic polarized object.

BACKGROUND

Robotic systems may be used in an agricultural industry. For example, the robots may be used for ploughing purposes, cutting of standing crops, eliminating weeds, etc. The robotic system may also be used for planting. However, the planting of seeds and/or bulbs (organic polarized objects) may be a difficult task for robots, as the robots may crush the seeds, mishandle the seeds, or orient the seeds in the wrong orientation during planting. In addition, there may be labor issues associated with workers and automation would alleviate some of the difficulties for the agricultural industry.

SUMMARY

A method, system and an apparatus to perform an automated image analysis of an organic polarized object are disclosed. In one aspect a method includes capturing an image of a first organic polarized object using an image capture device. In addition, the method includes collecting a first image data of the first organic polarized object. The method further includes algorithmically calculating a first dimension data of the first organic polarized object including a center and edges of the first organic polarized object using a processor. In addition, the method includes generating a first data table of the first dimension data of the first organic polarized object. The method also includes forming a training data set using transformation and/or scaling of the first data table of the first organic polarized object. The transformation may include, skewing, rotating, and the like.

The method may include capturing a second image or images of a second organic polarized object using the image capture device. In addition, the method may include collecting a second image data of the second organic polarized object. The method may further include algorithmically calculating a second dimension data of the second organic polarized object including, but not limited to the center and edges of the second organic polarized object using the processor. The dimension data described herein may be made of dimension parameters such as a width, a depth, a length, a distance, density, a curvature, a surface area, a volume, a narrow field, a broad field, edge, center and/or an angle. The method may also include calculating a high vote count using the second dimension data of the captured image of the second organic polarized object. The method may include creating a second data table of the second dimension data of the second organic polarized object. The method may include comparing the training data set to the second dimension data to identify the second organic polarized object and/or a precise orientation, location and size data of the second organic polarized object using the processor. The method may also include determining the dimension data as a distinct data for the second organic polarized object even if the second organic polarized object is adjacent, bordering, overlapping, underneath another object and/or an up-side down state. In addition, the method may include selecting a robotic end effector (e.g., robot arm/wrist) movement having an "n" degree of freedom of movement. The method may also include picking up the second organic polarized object using the robotic end effector in a precise orientation and location. The method may further include using the robotic end effector for transporting the second organic polarized object from a first location and first orientation to a predetermined second location and orientation in a specific tray with a slot.

In addition, the method may include having the slot in a specific shape to receive a first end of the second organic polarized object into the slot before a second end of the second organic polarized object, such that the first end of the second organic polarized object is oriented towards a narrow base of the slot and the second end is oriented towards a broad opening of the slot. The dimension data described herein may be made of dimension parameters such as a width, a depth, a length, a distance, density, a curvature, a surface area, a volume, a narrow field, a broad field, edge, center and/or an angle. In addition, the method may include finding the edges of the first organic polarized object from the captured image to generate the training set data. The method may also include correcting an angle of deposit based on the type of the slot. The method may further include depositing the organic polarized object in the precise orientation to the slot in the tray. In addition, the method may include permitting the "n" degrees of freedom of movement that include two or more of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along one or more of x, y, and z coordinate axes.

In another aspect, an organic polarized object detector system includes an image module to process an image of a first organic polarized object using a processor. In addition, the organic polarized object detector system includes an algorithm module to calculate a dimension data from a captured image of a first and a second organic polarized object. The organic polarized object detector system also includes a training set module to store a training set data. The organic polarized object detector system further includes a calibration module to align the coordinate systems of an image capture device and a robotic end effector. In addition, the organic polarized object detector system includes a movement module to direct the robotic end effector to perform a specific movement based on "n" degrees of freedom.

The system may include a transport module to determine the "n" degree of freedom movement for the robotic end effector. The system may also include the movement module to allocate a next best position for the second organic polarized object on a tray. In addition, the system may include a quality assurance module to guarantee the selection accuracy of the second organic polarized object through selection of a specific size, characteristics and/or shape of the second organic polarized object based on the training set data of first organic polarized object. The system may further include an alert module to indicate that a maximum threshold for depositing the second organic polarized object has been reached. The system may also include a change module to indicate a change of tray is warranted once the tray has reached a maximum capacity to hold the organic polarized object.

In yet another aspect, an organic polarized object detector apparatus includes an image capture device to record an image of a first organic polarized object and/or a second organic polarized object. In addition, the apparatus includes a data storage device to store a data set from the image capture device after a capture of the image. The apparatus also includes a processor to calculate the "n" degree of freedom movement for a robotic end effector using a training data set.

The apparatus also includes a tray with two or more slots to hold the organic polarized objects at a specific coordinate. The apparatus further includes a signal device to indicate that the tray has reached a maximum capacity and to prompt a change for another empty tray.

In addition, the apparatus may include the robotic end effector controlled by one or more pneumatic cylinders. The pneumatic cylinder may include a first elongated extension and a second elongated extension to hold the second organic polarized object. The apparatus may also include the first elongated extension and the second elongated extension having a sensor device to detect the presence of an organic polarized object. The system may further include software to control the robotic end effector and "n" degree of freedom movement for the robotic end effector. The sensor device described herein may include, but is not limited, one of a capacitive sensor, a resistive sensor and/or an inductive sensor. Also, the image capture device described herein may include, for example, an infra red device, a laser device, a camera, a biosensor, a color sensor, a heat sensor and/or a water sensor. The tray described herein may be a part of a large automated system.

Other aspects will be apparent from the following description and the appended claims.

BRIEF DESCRIPTION OF THE DRAWINGS

Example embodiments are illustrated by way of example and not limitation in the figures of accompanying drawings, in which like references indicate similar elements and in which.

Other features of the present embodiments will be apparent from accompanying Drawings and from the Detailed Description that follows.

DETAILED DESCRIPTION

Example embodiments, as described below, may be used to provide an automated image analysis for organic polarized objects. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1A:
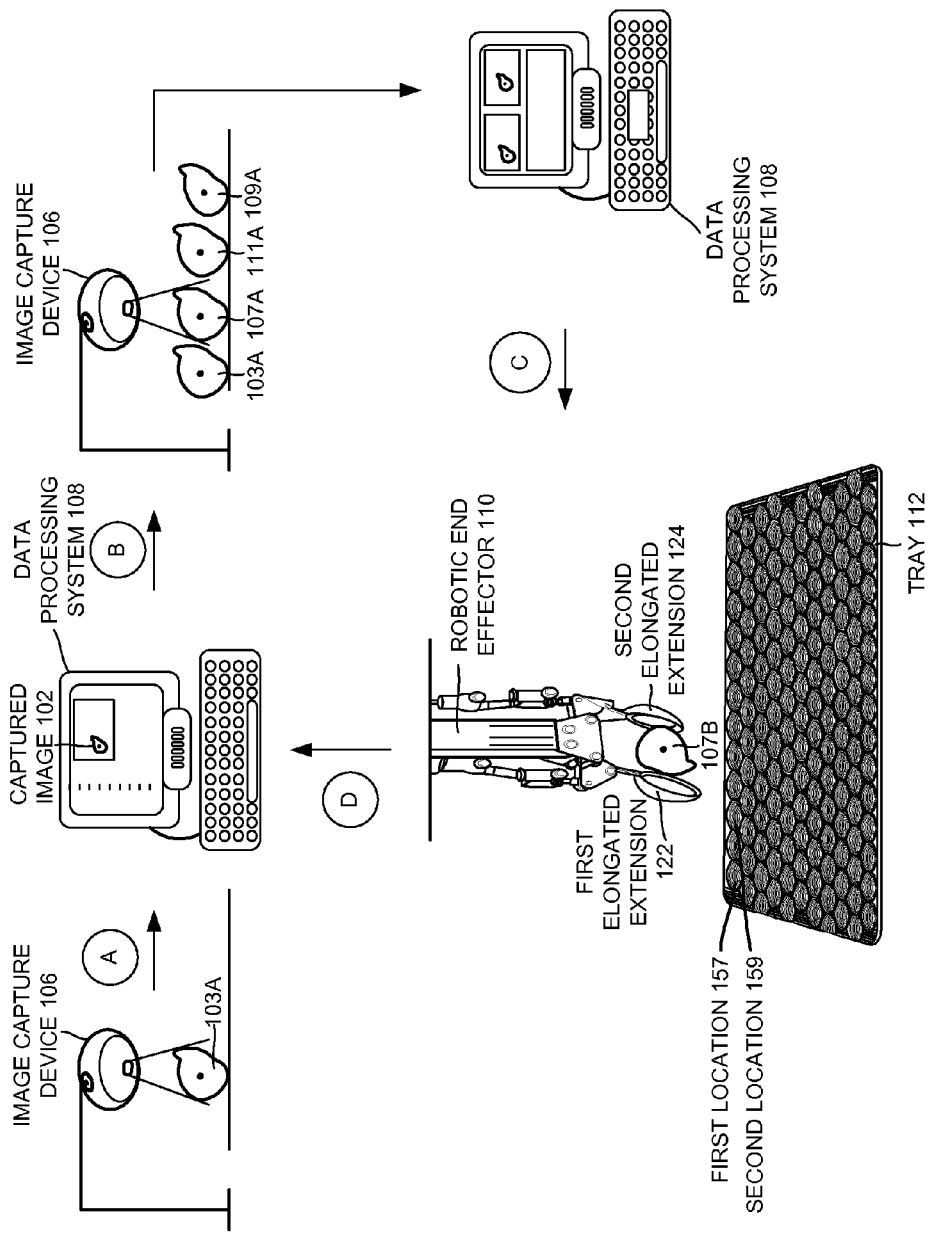
FIG. 1A is a diagrammatic process flow illustrating a process of object detection and placement, according to one or more embodiments.

FIG. 1A is a diagrammatic process flow illustrating a process of object detection and placement, according to one or more embodiments. The automated system described herein may be used for various purposes such as farming, packing, etc. In one or more embodiments, the automated system described herein may be comprised of a data processing system 108 (e.g. a computer), an image capture devices 106, a robotic end effector 110 communicatively coupled to each other. The object described herein may be any object, preferably an organic polarized object to be placed from one location and orientation to another location and orientation in an organized manner. As used herein, the term "organic polarized object" refers to any organic object of a regular or an irregular shape and form, having a proximal end and a distal end, and hence an orientation. The organic polarized object includes, for example, a seed, a plant bulb, a resting stage of a seed plant, and a sapling.

In one embodiment, the organic polarized object may be detected using a cellular component such as Adenosine Tri-Phosphate (ATP) (e.g., ATP being a content of the live organic polarized object). In alternate embodiments, objects other than the organic polarized object may be detected using one or more appropriate techniques. In one or more embodiments, the automated system as described herein may be trained to sense an organic polarized object and place the detected object in a tray 112 provided thereof. Step A of the process illustrated in FIG. 1A may be a training step. In step A, an image 102 of a detected object (e.g. an ideal organic polarized object 103A), may be captured using an image capture device 106 such as a digital camera, scanner, infra red camera device and laser camera device, and the like. The captured image 102 may be communicated to the data processing system 108. In one or more embodiments, the communication may be enabled through a wired communication (e.g., universal serial bus), and/or through a wireless communication (e.g. Bluetooth).

Examples of the data processing system 108 may include, but is not limited to, a computer, a microcontroller embedded device, and the like. The data processing system 108 may collect one or more captured images of the ideal organic polarized object 103A. The collected captured images may be stored in a storage device (e.g., accumulators in the memory) of the data processing system 108 provided thereof. Further, the collected captured images may be analyzed (e.g., using image processing) to detect and derive edges (e.g., through edge detection), center and other shape information. The edge detection may be a process of identifying points in the digital image at which the image brightness changes sharply or more formally has discontinuities. A series of curves that indicate boundaries may be obtained from the image. Furthermore, the center of the object 103A may be determined using appropriate methods using the detected edges. In addition, vectors may be generated from the captured image 102 of the ideal organic polarized object.

In addition, a table (e.g., data table) that includes the vector data, referred to herein after as the data table of vectors, may be generated. Furthermore, a training data set may be generated (e.g., based on ideal organic polarized object 103A) by transforming the data table of vectors. In one or more embodiments, the data table of vectors described herein may be converted into command instructions using software to enable the robotic end effector 110 to move to a specific location and/or orientation. Furthermore, the robotic end effector 110 may be configured by the data processing system 108 to pick up the organic polarized object and place it in a required location (e.g., a tray 112) and orientation. For example, the organic polarized objects (e.g. tulip bulbs) may be placed in slots of the tray 112 with an orientation such that the narrow end faces downwards and the broad end faces upwards (e.g., see FIG. 4). Alternatively, the tray 112 may include one or more pins at appropriate locations instead of slots so that the tulip bulbs can be fixed to the pins to hold the tulip bulbs for hydroponic growth technology. In one or more embodiments, hydroponic growth technology may be a technology that involves a method of growing plants using nutrient solutions, in water, without soil. The embodiments described herein may be used for supporting hydroponic technology as well.

In one or more embodiments, the tray 112 may be a grid of which coordinates, shape and size information may be programmed into the data processing system 108. In addition, the tray 112 may include one or more slots/pins to hold the organic polarized objects. In alternate embodiments, the grid information may be manually input by an operator of the automated system. The robotic end effector 110 may be controlled by pneumatic cylinder or any other suitable system provided thereof. In one example embodiment, the pistons in the pneumatic cylinder as described herein may be driven by compressed air.

Steps B-D of the process illustrated in FIG. 1A represent a real-time operation. In step B, the images of other organic polarized objects (e.g., 107A, 111A, etc.) may be captured and processed in a similar method to generate image data of each of the organic polarized objects in the data processing system 108. In one or more embodiments, dimension data including, but not limited to, edges may be computed. In addition, edges of the organic polarized object may be computed using the image data of the organic polarized object. Furthermore, in one or more embodiments, a binary image that displays contours in a monochrome color may be generated. In one or more embodiments, the training data set may be used for casting votes for determining a center of the organic polarized object (e.g., 107A, 111A, etc.). In one or more embodiments, the data table of vectors may be rotated "R" times, scaled "S" times and voting process may be performed. Furthermore, data collected from the voting may be stored until a vector set has been scaled "S" number of times and rotated "R" number of times.

The vote counts for each rotation and scaling may compare the training data set of the ideal organic object with the organic polarized object and may be stored in a vote compare table. A particular X,Y coordinate with the highest vote count among the other votes in the vote compare table may be located. Furthermore, the center of the contours of the binary image may be located at the particular X, Y coordinate if a vote count at the particular X,Y coordinate exceeds a threshold minimum vote count. Furthermore, in one or more embodiments, vector computation may be performed and training coordinates may be recorded and a training set data may be generated.

Further, the training data set of the ideal object may be used for comparing with the generated image data for selecting/discarding the organic polarized object, and for identifying a precise orientation data, size data, shape data and a location data of the organic polarized object (e.g., 107A, 111A, etc.). If the comparison evaluates to true, then the organic polarized object may be selected for placement. In one or more embodiments, the comparison evaluates to be true only if the dimension data of the organic polarized object of interest matches substantially with the data table of the training data set of the ideal organic polarized object 103A. In alternate embodiments, the organic polarized object may be rejected if the comparison evaluates to be false. In one or more embodiments, the size and orientation of the organic polarized object may be determined from the S, R value respectively associated with the vote compare table on which the particular X,Y coordinate is found if the vote count at the particular X,Y coordinate exceeds the threshold minimum vote count. Also, commands based on the generated data table may be communicated to the robotic end effector 110. Furthermore, in step C, of the process illustrated in FIG. 1A, based on the commands generated, the robotic end effector 110 may be configured to pick up the selected organic polarized objects and place/fix them in a designated location and a designated orientation such as a tray 112 provided thereof.

In one or more embodiments, the dimensions or the coordinates of the tray 112 may be input to the data processing system 108. In alternate embodiments, the tray 112 may be scanned by the image capture device 106 to determine dimensions or co-ordinates of the tray 112 to place the organic polarized objects. The process may continue until all or selected organic polarized objects of the set of the organic polarized objects are relocated. All the process described herein may be processed through a processor of the data processing system 108. The process described herein may be programmed using necessary programs written in any suitable language (e.g., C, java, etc.). In addition, the programs may be modified, new programs may be added and or programs may be deleted through interfaces provided thereof. The process of the automated system may be controlled through software. The term "software" described herein may include software, firmware, wired or programmed hardware, or any combination thereof as appropriate. Furthermore, image processing tools may also be used for processing the images of the organic polarized object. Also, an interface may be designed and implemented to enable communication between the robotic end effector 110 and the data processing system 108. Alternatively, the existing technology may be used for interfacing the data processing system 108 and the robotic end effector 110.

In addition, the commands to the robotic end effector 110 may be processed by a controller and other hardware of the robotic end effector 110. Furthermore, a pipelining process may be implemented to enable faster processing. For example, organic polarized objects in close proximity to the analyzed organic polarized object in the tray 112 may be analyzed during displacement of the organic polarized object to enable selection of the next organic polarized object. In one or more embodiments, the organic polarized objects to be analyzed may be adjacent, bordering, overlapping, an underneath or anywhere relative to a current organic polarized object of interest. In step D of the process illustrated in FIG. 1A, once the tray 112 is full, a new tray may be placed and the process would be started again from step B followed by step C till the tray is filled and then step D would be initiated.

Figure 1B:
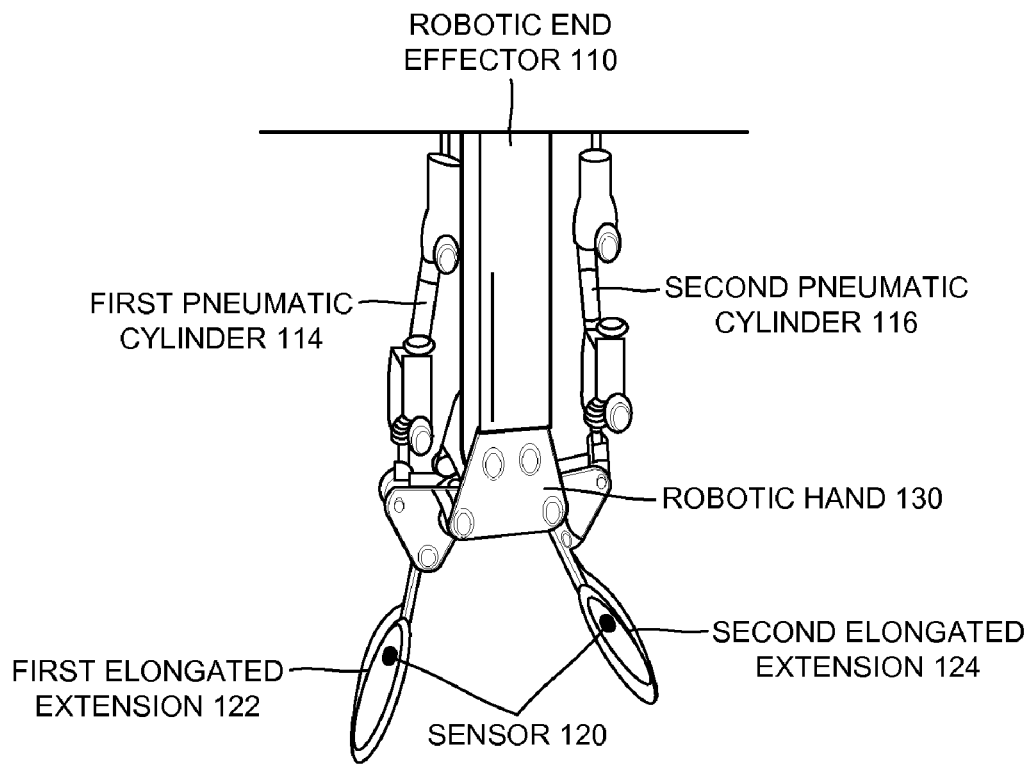
FIG. 1B is a perspective view of a part of a robotic end effector, according to one or more embodiments.

FIG. 1B is a perspective view of a portion of the robotic end effector 110, according to one or more embodiments. For purposes of illustration, the detailed description refers to an organic polarized object; however the scope of the method, the system, and the apparatus disclosed herein is not limited to a single organic polarized object but may be extended to include an almost unlimited number of organic polarized objects. As used herein, the term "organic polarized object" may refer to any organic polarized object of a regular or an irregular shape and form, having a proximal end and a distal end, and hence an orientation. Examples of the organic polarized object include, but are not limited to a seed, a plant bulb, a resting stage of a seed plant, and/or a sapling.

The robotic end effector 110 includes a robotic hand 130, one or more pneumatic cylinders (e.g. a first pneumatic cylinder 114, a second pneumatic cylinder 116, and a third pneumatic cylinder (not shown)), one or more elongated extensions (e.g., a first elongated extension 122, and a second elongated extension 124), and a valve (not shown). In one or more embodiments the robotic end effector 110 includes a sensor 120 to sense various parameters associated with the organic polarized object. Examples of the parameters include, but are not limited to, one or more dimensions, a stress withstanding capacity, one or more contours on a surface of the organic polarized object, and the like. The data processing system 108 may be enabled to capture an image of an organic polarized object through the image capture device 106 to determine a first location and/or a first orientation of the organic polarized object based on the image. In some embodiments, the image capture device 106 may be operatively coupled with the robotic end effector 110. In some other embodiments, the image capture device 106 may be external to the robotic end effector 110. In some embodiments, one or more feature extraction techniques including, but not limited to a generalized Hough transform may be used to determine the location, size, shape and orientation of the organic polarized object based on the image data.

In some embodiments, the first elongated extension 122 and/or the second elongated extension 124, include a cuff. The cuff may be disc-shaped and/or concave so as to secure the organic polarized object that is curved in shape and delicate in nature. In some embodiments, the cuff may be made of a flexible material to reduce the damage to the organic polarized object. In one or more embodiments, the elongated extensions may be made of the flexible material. Example of the flexible material includes, but is not limited to rubber and flexible plastic. In some embodiments, the first pneumatic cylinder 114 and the second pneumatic cylinder 116 regulate the movement of the first elongated extension 122 and the second elongated extension 124 respectively. In some embodiments, the third pneumatic cylinder 118 (not shown) regulates the movement of the robotic hand 130. For purposes of illustration, the detailed description refers to a first pneumatic cylinder, a second pneumatic cylinder, and a third pneumatic cylinder; however the scope of the method, the system, and/or the apparatus disclosed herein is not limited to the first pneumatic cylinder, the second pneumatic cylinder, and the third pneumatic cylinder but may be extended to include an almost unlimited number of pneumatic cylinders or other actuators.

Multiple pneumatic cylinders may be used to regulate the movement of the robotic end effector 110 and various components of the robotic end effector 110 therein. In one or more embodiments, motion of the robotic end effector 110 includes "n" degrees of freedom of movement. The "n" degrees of freedom of movement includes, but is not limited to, a moving up and down in heaving, a moving left and right in swaying, a moving forward and backward in surging, a tilting forward and backward in pitching, a turning left and right in yawing, a full axis motion in 360 degree rotation and a tilting side to side in rolling.

Figure 2A:
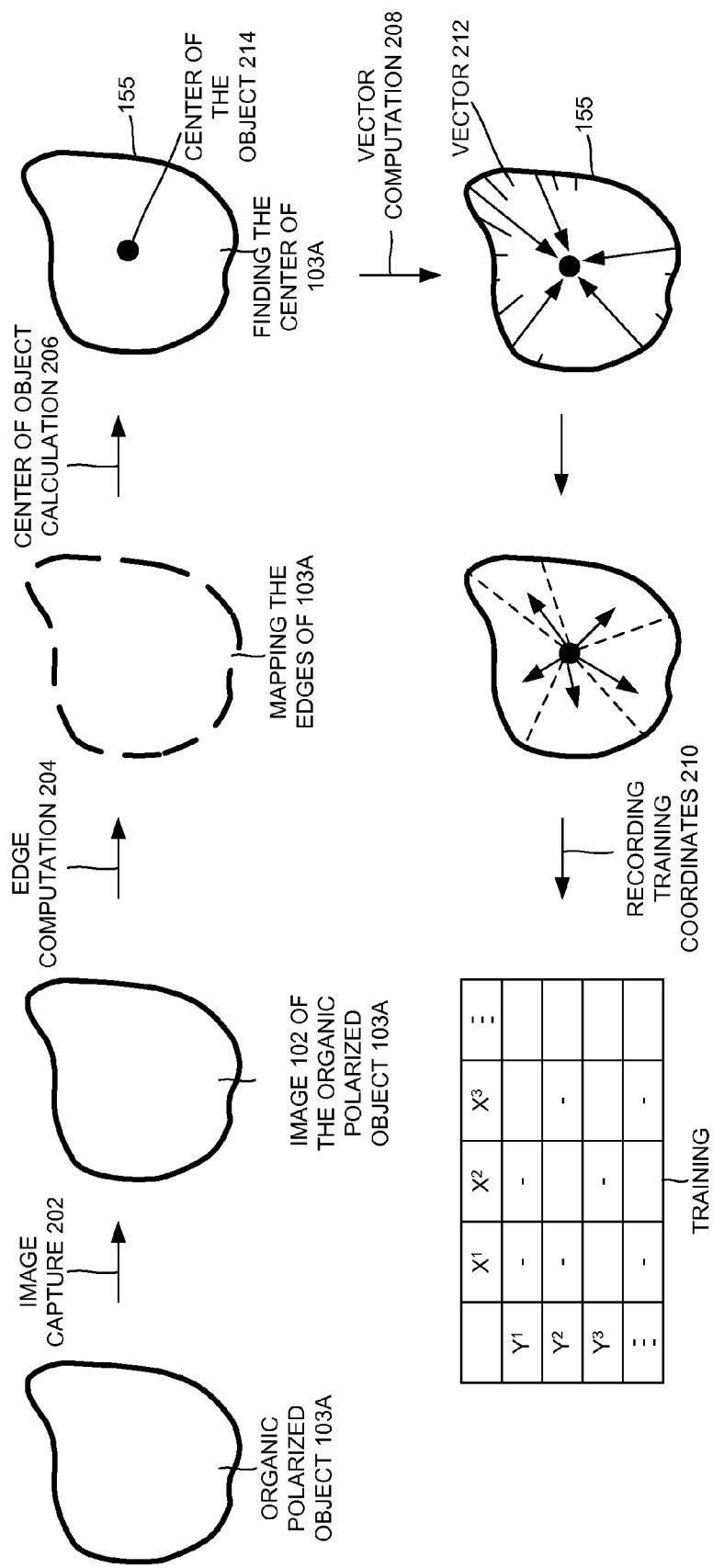
FIG. 2A is a diagrammatic process flow illustrating generation of a training data set, according to one or more embodiments.

FIG. 2A is a diagrammatic process flow illustrating generation of a training data set 220, according to one or more embodiments. FIG. 2A, in particular may be used to briefly elaborate the step A of the FIG. 1A. At step 202, an image 102 of the organic polarized object 103A may be captured using the image capture device 106 (e.g., a digital camera). The captured image 102 of the organic polarized object 103A may be communicated to the data processing system 108 (e.g., a computer), to an image processor enabled system or to any appropriate system for analysis and processing. An image data may be determined based on the image 102. At step 204, edges of the organic polarized object 103A may be computed and mapped using the image data to determine the shape of the organic polarized object 103A. Furthermore, at step 206, a center 214 of the organic polarized object 103A may be identified based on the mapped edges of the organic polarized object 103A. In one or more embodiments, at step 208, the image data associated with the organic polarized object 103A may be analyzed and one or more vectors 212 may be computed based on the image data. In one or more embodiments, at step 210, one or more training coordinates may be recorded and a training data may be generated. In one or more embodiments, a table that includes the training data may be generated. In one or more embodiments, the table may be termed as the training data set 220.

In one or more embodiments, the training data set 220 may be information (e.g., coordinate information, dimension information) that can be used for training and executing certain functionalities through systems such as a robotic vision system. In an example embodiment, the training data set 220 described herein may be used for generating commands or providing machine instructions for the robotic end effector 110 to perform aforementioned task. Furthermore, the robotic end effector 110 may be aligned with respect to the organic polarized object 103A to pick up the organic polarized object 103A and to place it in a specific location with a specified orientation. In addition, the training data set 220 may be used by the software for orienting the organic polarized object 103A as well.

Figure 2B:
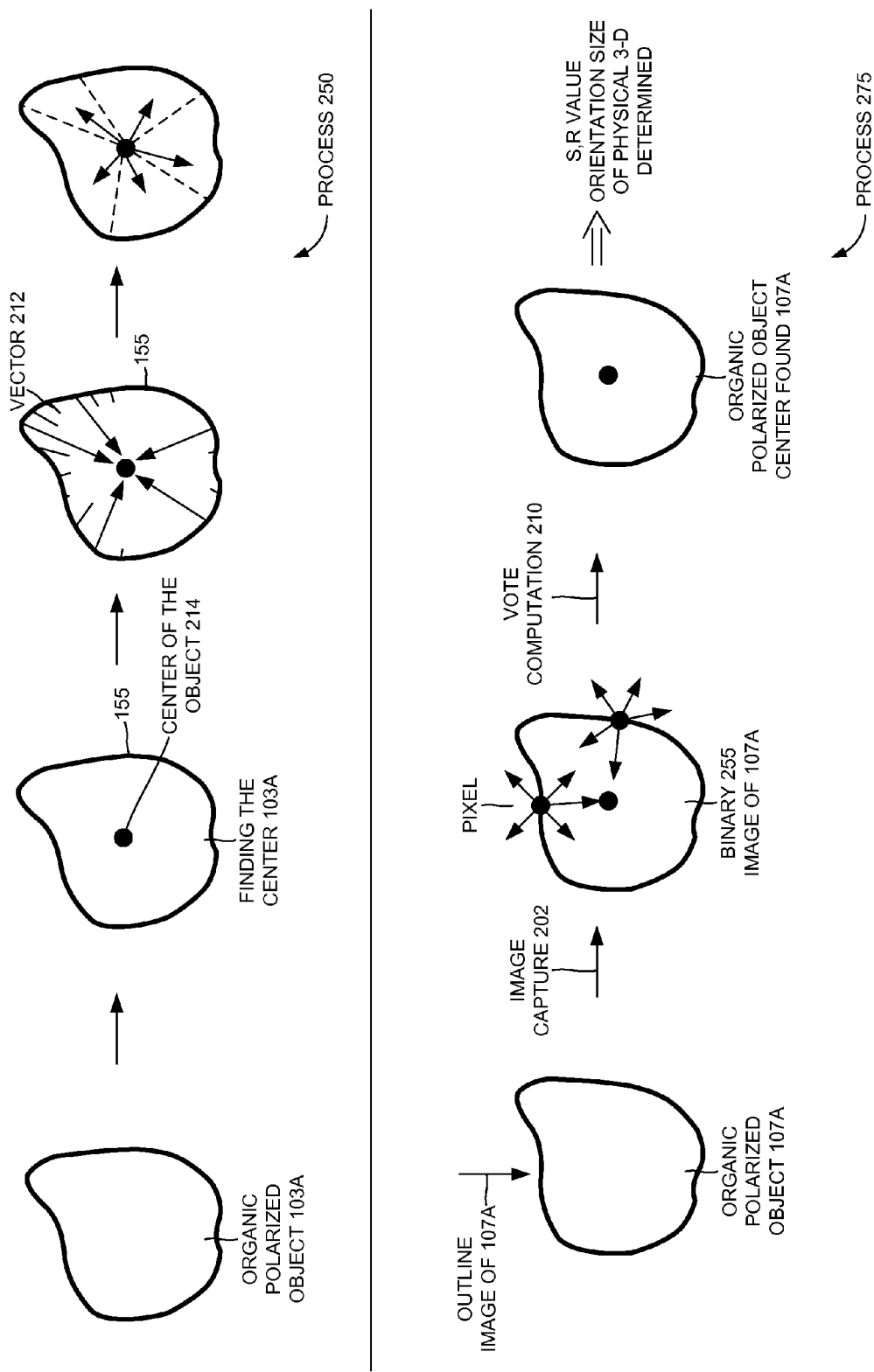
FIG. 2B is a diagrammatic process flow illustrating step A and step B of FIG. 1A, according to one or more embodiments.

FIG. 2B is a diagrammatic process flow illustrating step A and step B of FIG. 1A, according to one or more embodiments. In one or more embodiments, a process 250 illustrates the step A of FIG. 1A and a process 275 illustrates step B of FIG. 1A. In one or more embodiments, in the process 250 illustrated in FIG. 2B, an image 102 of the ideal organic polarized object 103A may be captured. Further, the image 102 of the ideal organic polarized object 103A may be analyzed to determine the edge and center 214 of the ideal organic polarized object 103A. Furthermore, the vectors 212 may be computed using the image 102 of the ideal organic polarized object 103A. Furthermore, the training coordinates may be recorded as illustrated in step 210 of FIG. 2A. In one or more embodiments, the process 275 differs from the process 250 as the process 250 is for obtaining information about the ideal organic polarized object 103A and the process 275 is for obtaining information about the other organic polarized objects for comparing with the training data generated from the ideal organic polarized object 103A for selection/rejection of other organic polarized objects for further procedure.

In one or more embodiments, in process 275, a raw image of any other organic polarized object, for example, the image of the organic polarized object 107A may be captured and processed. In one or more embodiments, the edges may be determined using the captured image to create an outline image. Further, a binary image 255 that displays the contours of the outline image of 107A of the organic polarized object 107A may be generated using the processed image. In one or more embodiments, the center may be determined using the steps as described. In one or more embodiments, a center of the vector set of a control object may be placed on each pixel in which the single monochrome color is present in the binary image 255. In one or more embodiments, a vote may be casted at an opposite end of each vector of the vector set whose center is placed on each pixel in which the single monochrome color is present in the binary image 255. Furthermore, in one or more embodiments, vote casting may be repeated at the opposite end of each vector of the vector set whose center is placed on each pixel in which the single monochrome color is present in the binary image 255 until the vector set has been scaled "S" number of times and rotated "R" number of times (S and R are positive integers).

Further, data collected from the voting may be stored until the vector set has been scaled "S" number of times and rotated "R" number of times generating votes at X, Y coordinates of the binary image 255 and saved in vote compare tables created individually for each unique S and R pair. Further, a particular X and Y coordinate may be located with the highest vote count among any vote compare table. The center of the contours of the binary image 255 may be located at the particular X and Y coordinate if a vote count at the particular X, Y coordinate exceeds a threshold minimum vote count. Further, the size and orientation of the organic polarized object 107A may be determined from the S, R value respectively associated with the vote compare table on which the particular X, Y coordinate is found if the vote count at the particular X,Y coordinate exceeds the threshold minimum vote count.

In one or more embodiments, after determining the image center of the contour, a physical three dimensional world coordinates of the organic polarized object 107A may be determined as described. In one or more embodiments, a camera model algorithm may be applied that considers a focal length of the image capture device 106, a distortion of the image capture device 106, a warping factor, a distance from a center of a lens of the image capture device 106 to an internal projected image location of the image capture device 106, and a distance between an estimation of the center of the organic polarized object 107A and the center of the lens of the image capture device 106. Furthermore, the estimation of the three dimensional world coordinates of the center of the organic polarized object 107A may be determined by averaging of a distance between a surface under the organic polarized object and the center of the lens, and a closest physical point of the organic polarized object to the center of the lens.

Figure 3A:
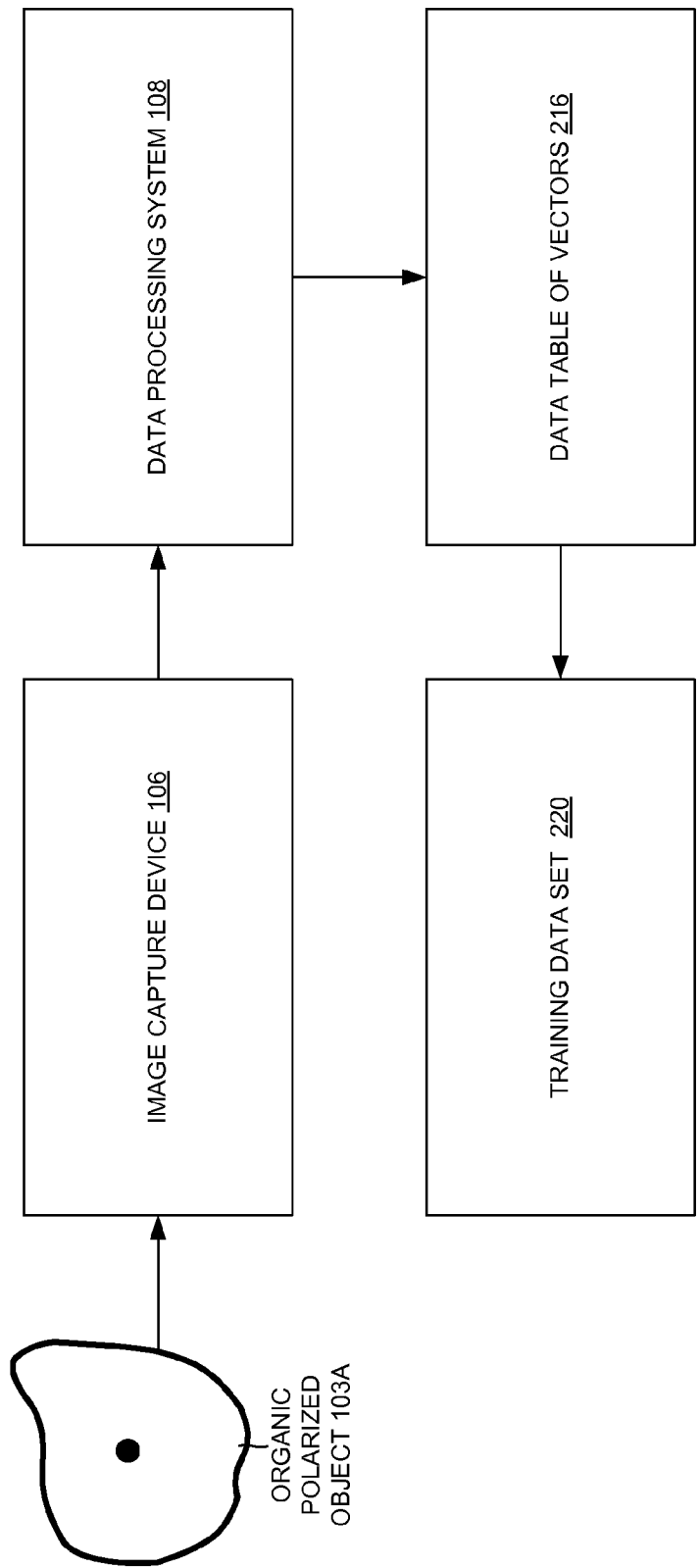
FIG. 3A is a schematic view illustrating generation of a training data set, according to one or more embodiments.

FIG. 3A is a schematic view illustrating generation of a training data set 220, according to one or more embodiments. As described above, in one or more embodiments, an image of the ideal organic polarized object 103A may be captured using the image capture device 106 and communicated to the data processing system 108. In one or more embodiments, a data table of vectors 216 based on the vector information of the ideal organic polarized object 103A may be generated using suitable methods. In one or more embodiments, the generated data table of vectors 216 may be used to obtain the training data set 220. The training data set 220 may be composed of transformations of the data table of vectors 216 associated with one or more organic polarized objects.

Figure 3B:
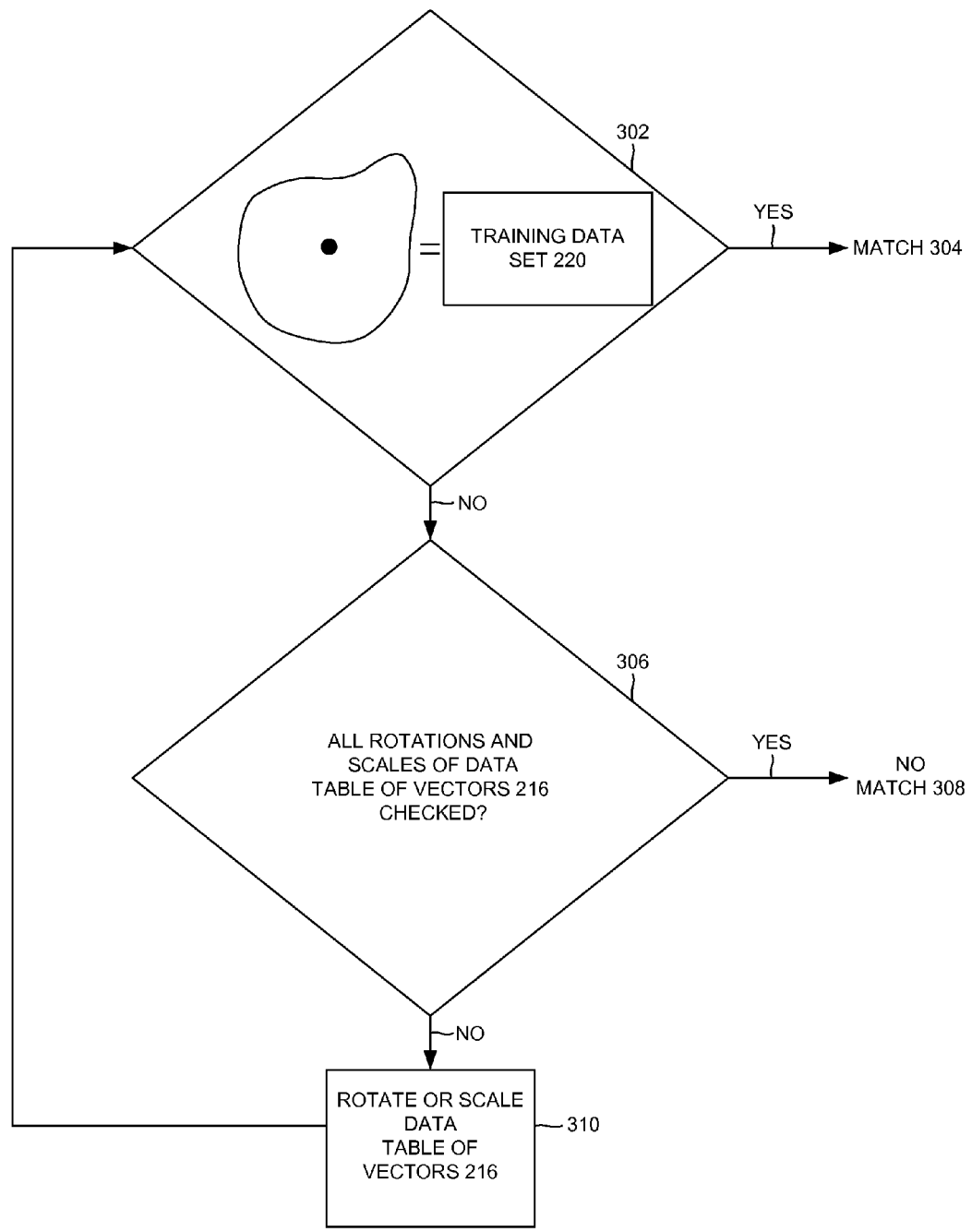
FIG. 3B is a flow chart illustrating a process of comparing a dimension data of an organic polarized object of interest to a training data set to identify if the organic polarized object of interest possesses the desirable shape and size, as specified in the training data set, according to one or more embodiments

FIG. 3B is a flow chart illustrating a process of comparing a data of an organic polarized object of interest with the training data set 220, containing the necessary vector information on rotation and scaling of the data table of vectors 216 to identify if the organic polarized object of interest possesses the desirable shape and/size, as specified in the training data set 220, according to one or more embodiments. Aforementioned process may be repeated for other organic polarized objects of interest. The images of the organic polarized objects of interest may be captured through the image capture device 106 provided thereof. The images may be processed by the data processing system 108. In one or more embodiments, in operation 302, the training data set 220 may be used for casting votes for determining a center of the organic polarized object of interest. The data table of vectors 216 may be rotated, scaled and voting process may be performed. The vote counts for each rotation and scaling may be compared to determine the orientation, size, shape, and location of the organic polarized objects. A particular orientation, size, and/or location for which the vote counts are highest may be selected. In one or more embodiments, if the highest vote count generated is above a specified threshold, then the organic polarized object is considered to be identified and is chosen for placement in operation 304.

Furthermore, if there is no substantial match in information between the organic polarized object of interest and the information in the training data set 220 of the ideal organic polarized object 103A, then in operation 306, it may be determined whether all rotations and scaling of data table of vectors 216 is performed (e.g., by comparing vote count information obtained at each rotation and scaling of organic polarized object with the data table of vectors 216 of the ideal organic polarized object 103A). Furthermore, if it is determined that all rotations and scales of the data table of vectors 216 are checked and there is no substantial match between the organic polarized object of interest and the ideal organic polarized object, then in operation 308, the organic polarized object of interest may be rejected. In one or more embodiments, in operation 310, rotation and scaling operation may be continued. Further, operation 302 may be initiated to determine a match and the process is continued until the organic polarized object of interest is matched with the ideal organic polarized object 103A or else the organic object of interest is rejected for not matching.

Figure 4:
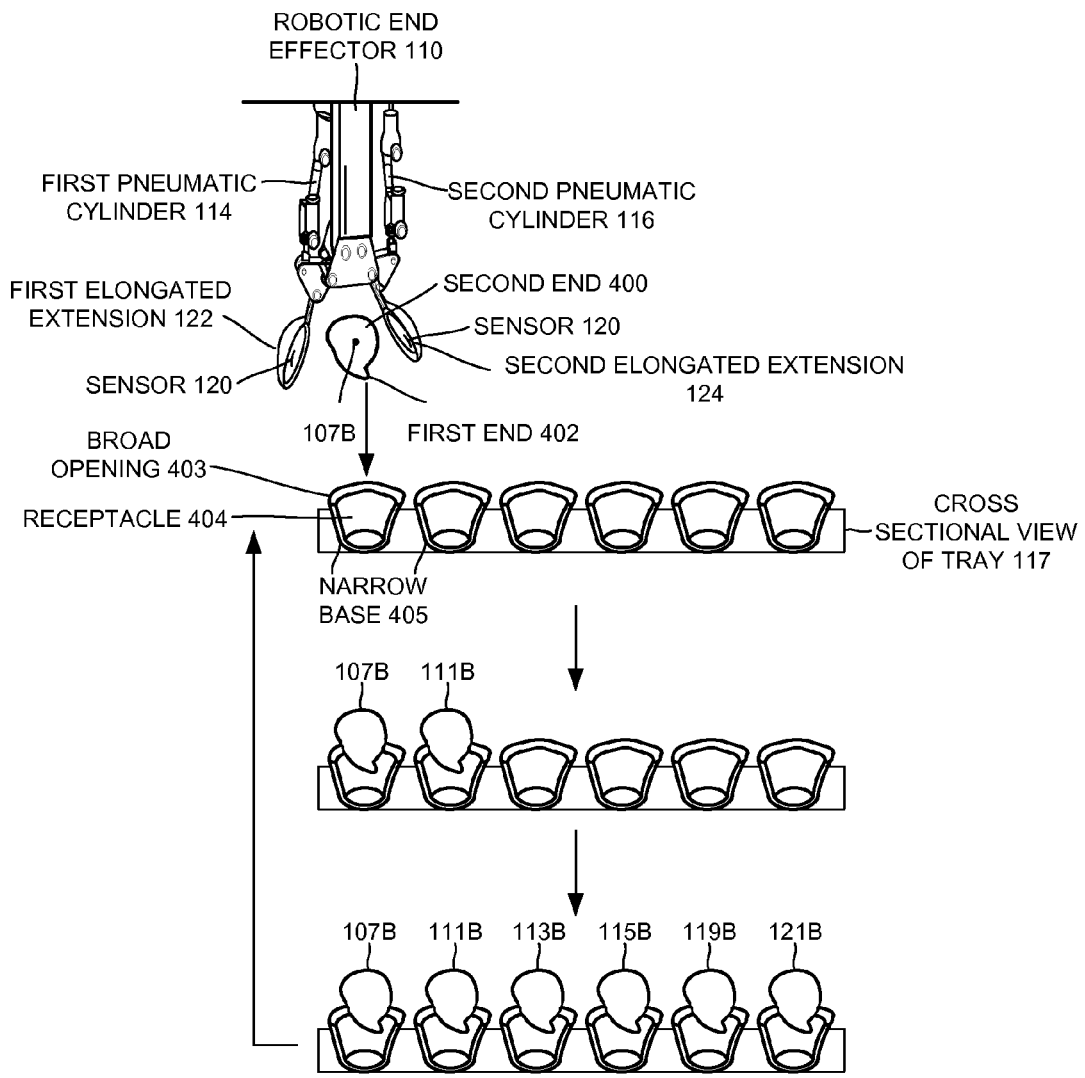
FIG. 4 is a continuation of the process of FIG. 3B, illustrating additional operations, according to one or more embodiments.

In one or more embodiments, the robotic end effector 110, shown in FIG. 4, may be driven by pneumatic cylinders. Furthermore, the pneumatic cylinders may be driven by compressed air. The compressed air may be provided by appropriate means controlled using the software. In alternate embodiments, the robotic end effector 110 may also be controlled through gear systems, or belt drives, or in any suitable mode of driving. In one or more embodiments, the robotic end effector 110 may be controlled through a control unit (e.g., memory, controller, and other necessary circuitry) of the robotic end effector 110. In one or more embodiments, the instructions may be generated by the control unit based on the training data set 220.

FIG. 4 is a continuation of the process of FIG. 3B, illustrating additional operations, according to one or more embodiments. In particular, FIG. 4 illustrates step C of FIG. 1A. In one or more embodiments, the selected organic polarized objects may be placed into the tray 112 provided thereof. The subsequent selected organic polarized objects (e.g., 107B, 111B, 113B, 115B, 119B, 121B, etc) may be placed continuously thereafter. An alert may be communicated to the data processing system 108 as processing system if the tray 112 becomes full. In addition, a signaling device (e.g., a weight based communication device, count based communication device, inventory device, and the like) may be used to indicate that the tray 112 has reached a maximum capacity. In alternate embodiments, other indicators may be used to indicate to an operator that the tray 112 has reached the maximum capacity. Furthermore, the alerts may be communicated to the data processing system 108 through wired communication or through wireless communication (e.g., Wifi, Wibree, or any suitable module). The signal device may also be configured to prompt/request for a change of tray 112 when the tray is full. In one or more embodiments, a new tray 112 may be placed automatically once the tray 112 is full or based on the request. It should be noted that the tray 112 may be a part of a larger automated assembly system.

Furthermore, in one or more embodiments, the robotic end effector 110 may also be configured by the data processing system 108 to pick up the organic polarized object in a specific location and orientation and place the organic polarized object in a specified location and orientation. For example, in case of flower pots, the flower pots may have to be carried in an upright position and placed in a same orientation in the slot provided. In another example, in a case of tulip bulbs, the tulip may be picked up and placed such that the broad end is facing up and narrow end is facing down (e.g., see FIG. 4). In alternate embodiments, pins may be provided in the place of slots. The robotic end effector 110 may be configured to place the tulip bulbs on the pins in a specified orientation.

In one or more embodiments, FIG. 4 particularly illustrates orientation based placing. FIG. 4 also illustrates an organic polarized object having a physical shape with a first end 402 that is narrow in nature and a second end 400 that is broad in nature. In one or more embodiments, specific type of organic polarized objects may have substantially similar physical structure. Such organic polarized objects may have to be placed in a particular orientation. In addition, the tray 112 or the holder may be specifically designed based on the shape of the organic polarized object. The tray 112 described herein may include one or more slots to hold the organic polarized objects. The slots described herein may be designed based on needs (e.g., broad opening and narrow base to hold plant bulbs).

In the example embodiment, the shape of the organic polarized object may be analyzed by the data processing system 108. In addition, instructions may be provided by the data processing system 108 to the robotic end effector 110 to orient the organic polarized object in a particular angle so that the organic polarized object may be picked up and placed in a required orientation. FIG. 4 illustrates the robotic end effector 110 placing an organic polarized object 107B in slots of the tray 112. The slot may be designed in a specific shape such that the organic polarized object 107B may be received in an orientation in a receptacle 404 of the slot such that a first end 402 is received towards the narrow base 405 of the slot and a second end 400 is at the top of the slot towards a broad opening 403 of the slot. The organic polarized object 107B may be placed in the slot of the tray 112 to fit the shape of slot of the tray 112. Alternatively, the tray 112 may also be designed based on the shape of the organic polarized object 107B. The organic polarized object 107B may be picked up and placed using a first elongated extension 122 and a second elongated extension 124 of the robotic end effector 110. In one or more embodiments, the first elongated extension 122 and/or the second elongated extension 124 may be made of a soft, strong and flexible material.

Furthermore, the movement of the first elongated extension 122 and/or the second elongated extension 124 may be monitored by sensor 120 embedded in the first elongated extension 122 and/or the second elongated extension 124. Errors, tilts, malfunctioning of the first elongated extension 122 and/or the second elongated extension 124 may be detected by the sensors and may be communicated to the control unit of the robotic end effector 110 as well as the data processing system 108. Furthermore, necessary corrections may be performed and verified using the sensor 120. In addition, a pressure for lifting the organic polarized object 107B may be input to the data processing system 108. Alternatively, the robotic end effector 110 may be programmed to apply sufficient pressure to lift the organic polarized object 107B. Examples of the sensor 120 used herein may include, but are not limited to one or more of a pressure sensor, a resistive sensor, a capacitive sensor, and an inductive sensor.

Figure 5:
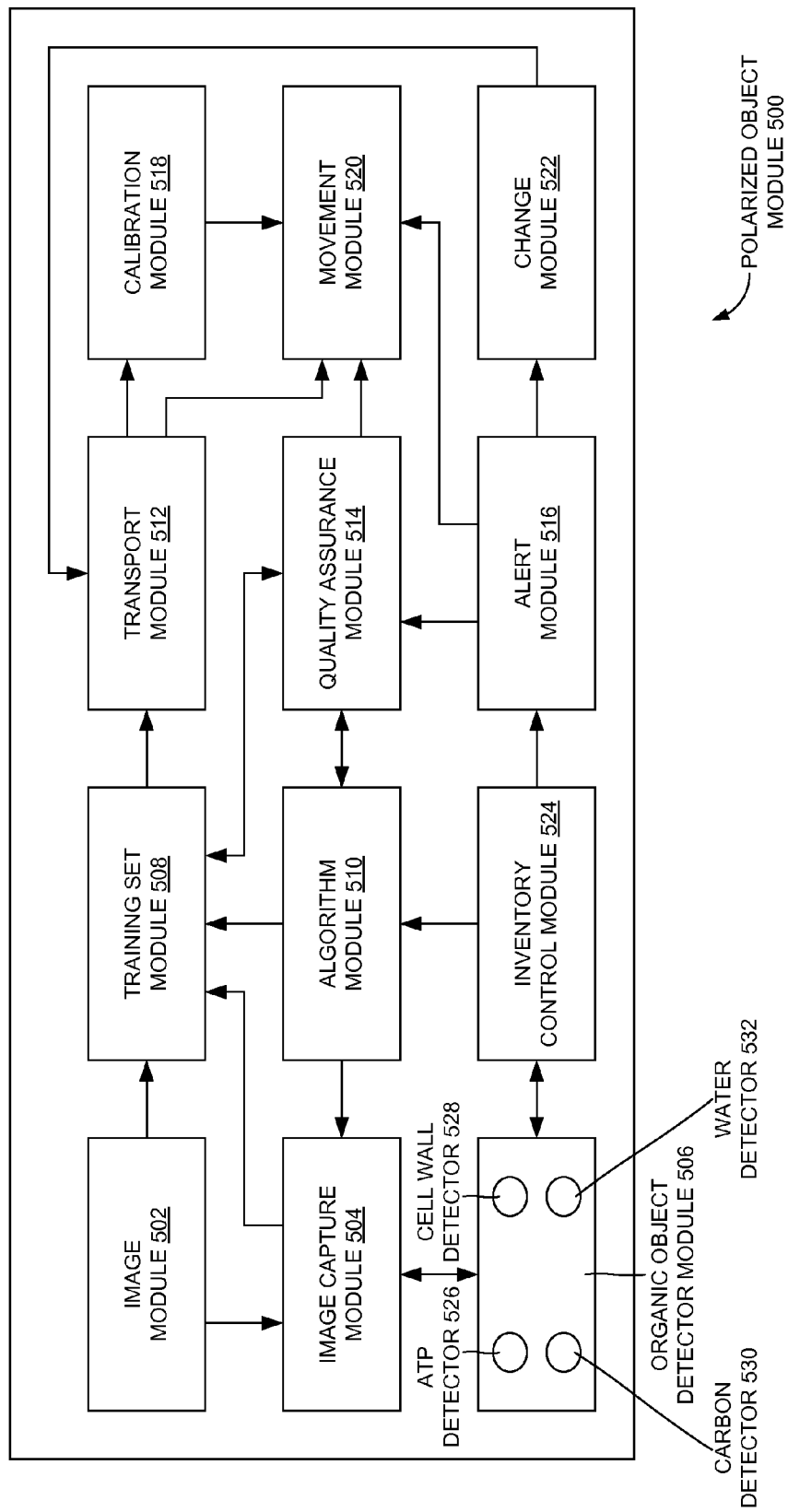
FIG. 5 is a schematic view illustrating a system of object detection and placement, according to one or more embodiments.

FIG. 5 is a schematic view illustrating a system of organic polarized object detection and placement, according to one or more embodiments. The system includes a polarized object module 500. The polarized object module 500 includes, but is not limited to an image module 502, an image capture module 504, an organic object detector module 506, a training set module 508, an algorithm module 510, a transport module 512, a quality assurance module 514, an alert module 516, a calibration module 518, a movement module 520, a change module 522, and an inventory control module 524. The image capture device 106 may be configured by the image capture module 504 to capture the images periodically and to communicate to the captured images to the training set module 508. The captured image may be processed by the image module 502 based on an algorithm. In addition, the presence of any organic polarized object at the end effector 110 may be detected by an organic object detector module 506. In one or more embodiments, the organic object detector module 506 may include organic sensors such as cell wall detector 528, water detector 532, ATP detector 526, and/or a carbon detector 530.

Furthermore, the dimension data based on the image data of the captured image 102 may be calculated using the algorithm module 510. The training data set 220, consisting of data tables of vectors, may be generated using the organic polarized object image data by the training set module 508 using the algorithm module 510. Furthermore, the vote counts of the each of the other organic polarized objects may be generated with the training data set 220 for choosing an object that is substantially similar to the ideal organic polarized object 103A. Based on the result, the instructions may be generated for the robotic end effector 110 to pick up the organic polarized object (e.g., if the comparison evaluates to be true), or else to reject the organic polarized object (e.g., if the comparison evaluates to be false). The result data may be communicated \ to the transport module 512 to generate instructions for the robotic end effector 110 to perform a specific function. The coordinate system of the robotic end effector 110 and image capture device 106 may be aligned by the calibration module 518 to grasp the organic polarized object.

The robotic end effector 110 may be directed by the movement module 520 to perform a specific movement (e.g., alignment, orientation, etc.) based on the dimension data of the organic polarized object of interest. In addition, the robotic end effector 110 may be configured by the movement module 520 to perform tasks with available degrees of freedom (DOF). In one or more embodiments, the robotic end effector 110 may be designed to have 'n' DOF (e.g., where 'n' is any positive integer) of movement. In one or more embodiments, the robotic end effector 110 may be designed with 'n' DOF for movement that includes, but not limited to, a moving up and down in heaving, a moving left and right in swaying, a moving forward and backward in surging, a tilting forward and backward in pitching, a turning left and right in yawing, a full axis motion with 360 degree rotation, a tilting side to side in rolling, and a moving along one or more of x, y, and z coordinate axes. In one or more embodiments, the movement and functionalities may be controlled through the movement module 520 controlled using the processor of the data processing system 108. Furthermore, the selected object may be picked up and placed into the tray 112. In one or more embodiments, the process is continued until all the slots in the tray 112 are filled.

Furthermore, a request for the new tray 112 may be communicated by the change module 522. In one or more embodiments, an alert may be communicated to by the alert module 516 to indicate to the data processing system 108 that the tray 112 is full. In one or more embodiments, the change module 522 may be triggered by the alert module 516. The alert module 516 may be controlled by the inventory control module 524. The quantity to be displaced, the speed of displacement, data processing, modification of algorithms, etc. may be controlled through the inventory control module 524. In one or more embodiments, the operator may be provided with an interface to configure the settings of the system through the inventory control module 524. Any odd organic polarized object (e.g., varying significantly in size, shape, condition or material) in the set of organic polarized objects may be rejected or separated through the quality assurance module 514. The determination of the odd organic polarized object in the set of organic polarized objects may be performed by the quality assurance module 514 based on a size, shape, material, condition etc. using the detectors provided herein.

In one or more embodiments, the robotic end effector 110 may also be trained for performing tasks associated with the organic polarized objects with respect to a particular organic polarized object. For example, the robotic end effector 110 may be trained to recognize and plant tulip bulbs. The tulip bulbs may be recognized, properly oriented and then planted in a grid provided thereof. In one or more embodiments, the robotic end effector 110 may be trained specifically through the user interface provided. Furthermore, in one or more embodiments, the robotic end effector 110 in the automated system may also be trained to simply pick up and place the objects. The embodiments described herein may be used for planting crops (e.g., tulips), arranging the organic polarized objects for packing, choosing the best organic polarized objects among the organic polarized objects.

Figure 6A:
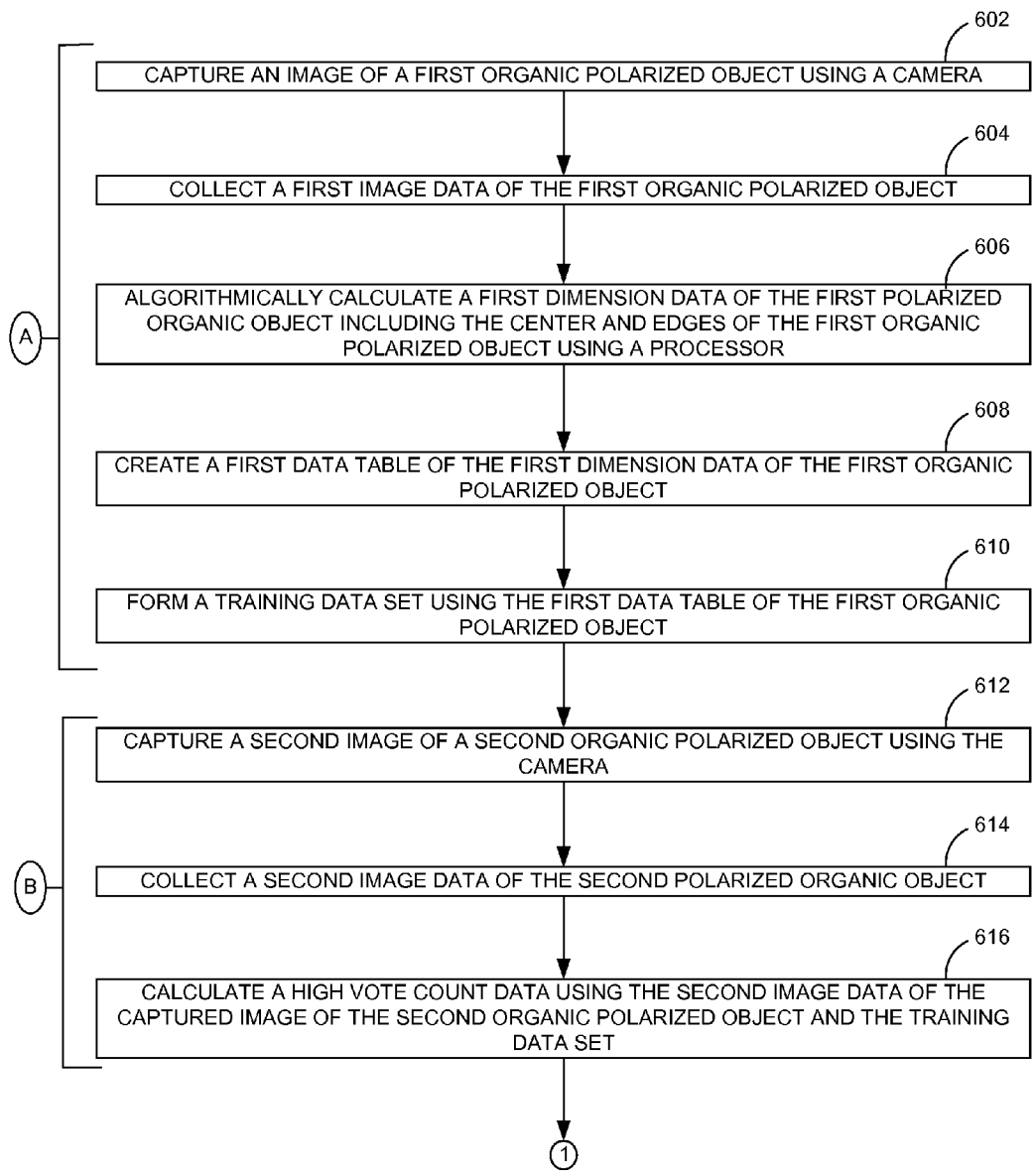
FIG. 6A is a process flow illustrating identification of organic polarized objects and placement of the same, according to one or more embodiments.

FIG. 6A is a process flow illustrating identification of organic polarized objects and placement of the same using the automated system, according to one or more embodiments. In operation 602, an image of a first organic polarized object (e.g., an ideal organic polarized object) may be captured using the image capture device 106. In operation 604, a first image data of the first organic polarized object (e.g., ideal organic polarized object) may be collected. In one or more embodiments, the image data may be collected by the data processing system 108. In operation 606, a first dimension data of the first organic polarized object including, but not limited to a center and edges of the first organic polarized object may be algorithmically calculated using the processor of a data processing system (e.g. data processing system 108). In operation 608, a first data table (e.g., vector data) of the dimension data of the first organic polarized object 103A may be created. In operation 610, the training data set 220 may be formed by rotating and scaling and/or transforming (e.g., skewing, rotating) the first data table of the first organic polarized object 103A. The aforementioned operations are associated with the steps A of FIG. 1. In operation 612, an image of a second organic polarized object 107A may be captured using the image capture device. In operation 614, the captured image of the second organic polarized object 107A may be collected (e.g., using the data processing system 108). In operation 616, high vote count data may be calculated for the second image data of the captured image of the second organic polarized object 107A using the training data set.

Figure 6B:
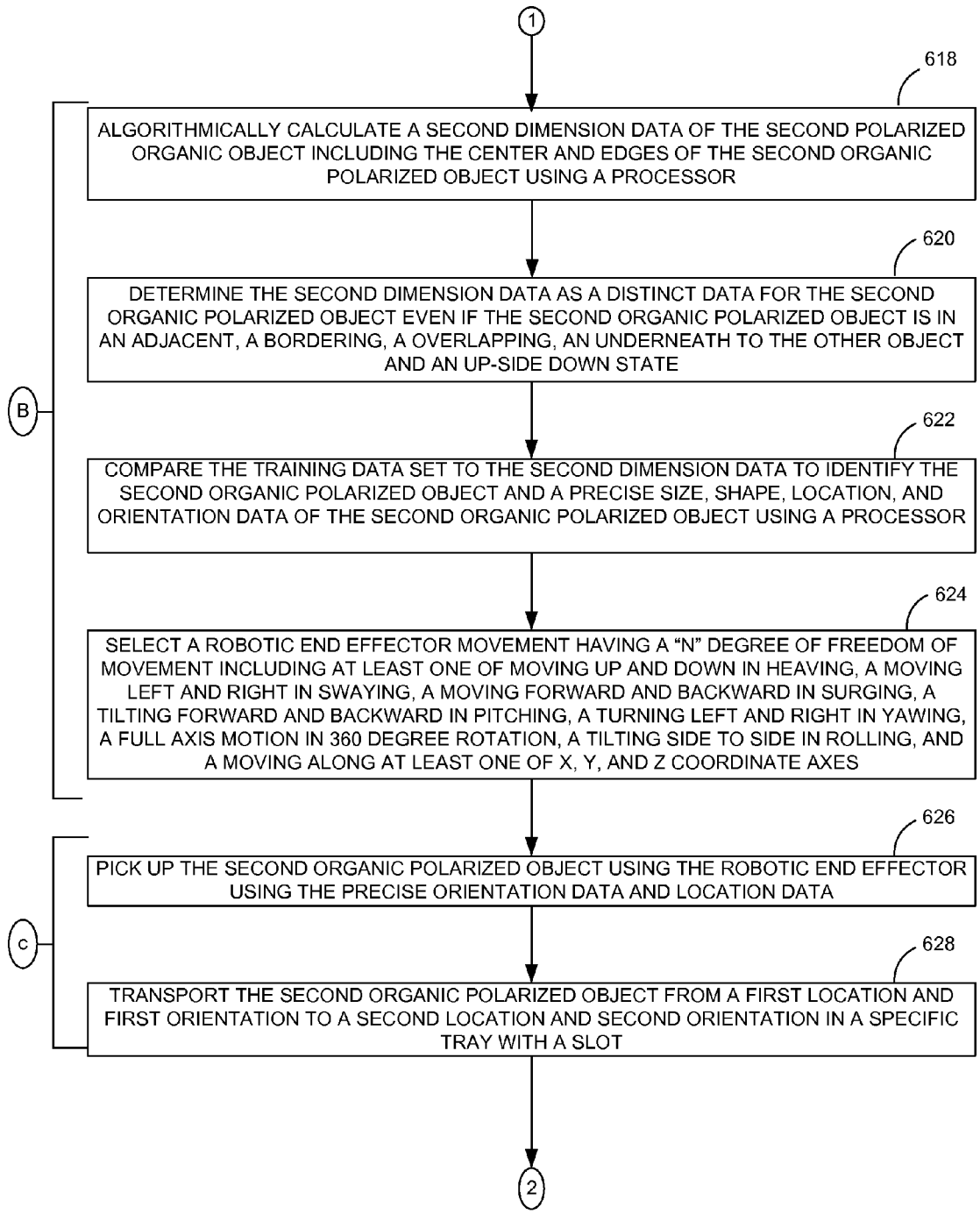
FIG. 6B is a continuation of process flow of FIG. 6A, illustrating additional operations, according to one or more embodiments.

FIG. 6B is a continuation of process flow of FIG. 6A, illustrating additional operations, according to one or more embodiments. In operation 618, a second dimension data of the second organic polarized object 107A including, but not limited to the center and edges of the second organic polarized object 107A may be algorithmically calculated using the processor. In operation 620, the second dimension data may be determined as a distinct data for the second organic polarized object 107A even if the second organic polarized object 107A is in a position that may be adjacent, a bordering, a overlapping, an underneath to the other object and an up-side down state. In operation 622, the training data set may be compared with the second dimension data of the second organic polarized object 107A to identify the second organic polarized object 107A and precise size, shape, orientation and location data of the second organic polarized object 107A using the processor.

In operation 624, the robotic end effector movement having an "n" degree of freedom of movement may be configured to pick up the second organic polarized object. The "n" degrees of freedom of movement is one or more of a moving up and down in heaving, a moving left and right in swaying, a moving forward and backward in surging, a tilting forward and backward in pitching, a turning left and right in yawing, a full axis motion in 360 degree rotation, a tilting side to side in rolling, and moving along one or more of x, y, and z coordinate axes. The operations from 612 to 624 may represent the step B of FIG. 1.

In operation 626, the second organic polarized object 107A may be picked up using the robotic end effector 110 and the precise location/orientation data. In one or more embodiments, the second organic polarized object 107A may be picked up only if the comparison evaluates to be true. In operation 628, the second organic polarized object 107A may be transported from a first location and first orientation to a second location and second orientation in a specific tray 112 with two or more slots.

Figure 6C:
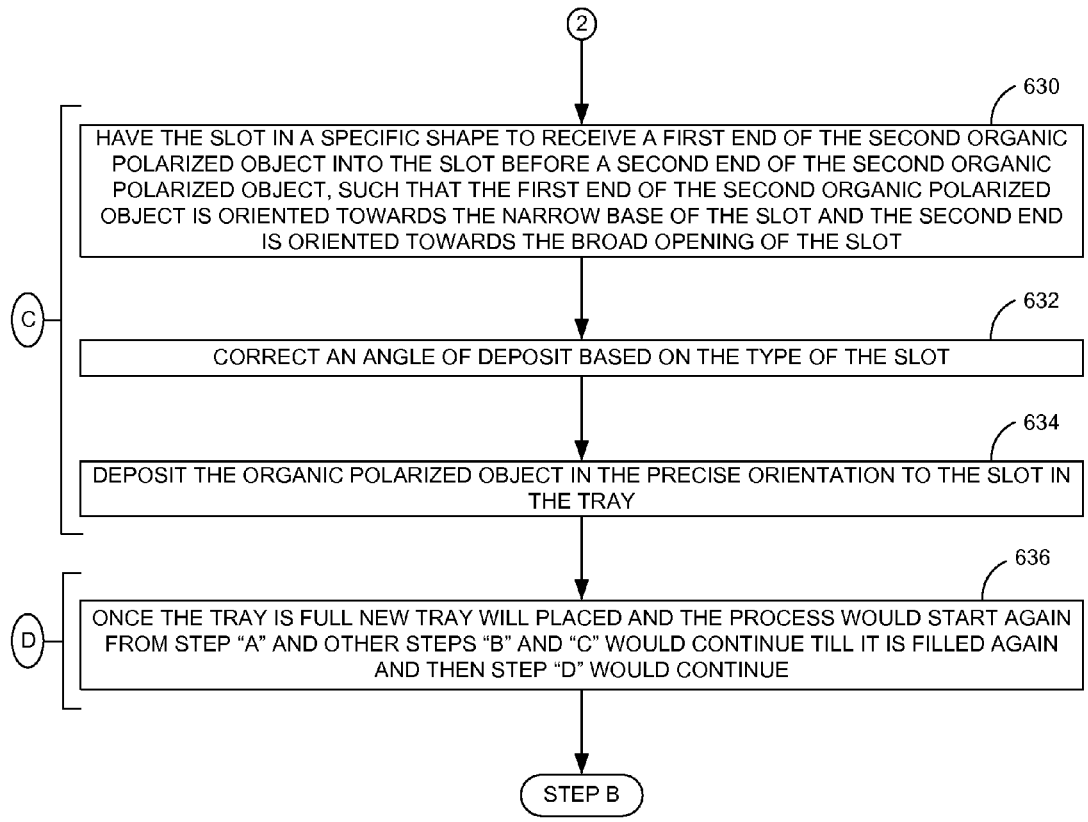
FIG. 6C is a continuation of process flow of FIG. 6B, illustrating additional operations, according to one or more embodiments.

FIG. 6C is a continuation of process flow of FIG. 6B, illustrating additional operations, according to one embodiment. In operation 630, the slot in a specific shape may be used to receive the first end 402 of the second organic polarized object 107A into the receptacle 404 of the slot before the second end 400 of the second organic polarized object 107A, such that the first end 402 of the second organic polarized object 107A is oriented towards a narrow base 405 of the slot and the second end 400 is oriented towards a broad opening 403 of the slot. In operation 632, an angle of deposit may be corrected. The correction may be based on the type of the slot. In operation 634, the second organic polarized object 107A may be deposited in the precise orientation to the slot in the tray 112 (e.g., as illustrated in FIG. 4). The operations from 626 to 634 may represent the step C of FIG. 1. In operation 636, once the tray is full, a new tray would be placed and the process would start again from step A, followed by step B and then step C till the tray is filled. Operation 636 may represent step D of FIG. 1. Once the tray is full step D continues.

Figure 7:
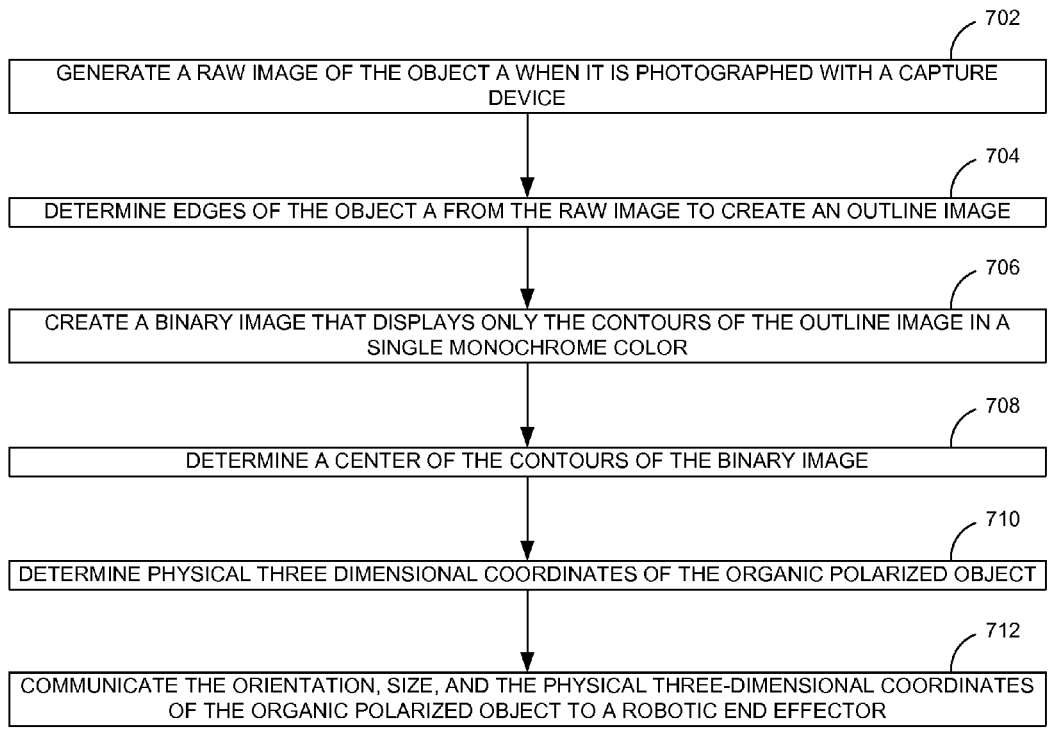
FIG. 7 is a process flow illustrating generating a orientation, size and the three-dimensional coordinates of the organic object of interest and communication of the same to the robotic end effector, according to one or more embodiments.

FIG. 7 is a process flow illustrating generating an orientation, size and the three-dimensional coordinates of the organic object of interest and communication of the same to the robotic end effector 110. In one or more embodiments, in operation 702, a raw image of the organic polarized object may be generated from the image capture device 106. In one or more embodiments, in operation 704, edges of the organic polarized object may be determined from the raw image to create an outline image. In one or more embodiments, appropriate edge detection algorithms or tools may be used for detecting the three-dimensional shape of the organic polarized object. In operation 706, a binary image 255 that displays the contours of the outline image in a single monochrome color may be created. In operation 708, a center of the contours of the binary may be determined. In operation 710, physical three dimensional coordinates of the organic polarized object may be determined. In operation 712, the orientation, size, and the physical three dimensional coordinates of the organic polarized object may be communicated to the robotic end effector 110.

Figure 8:
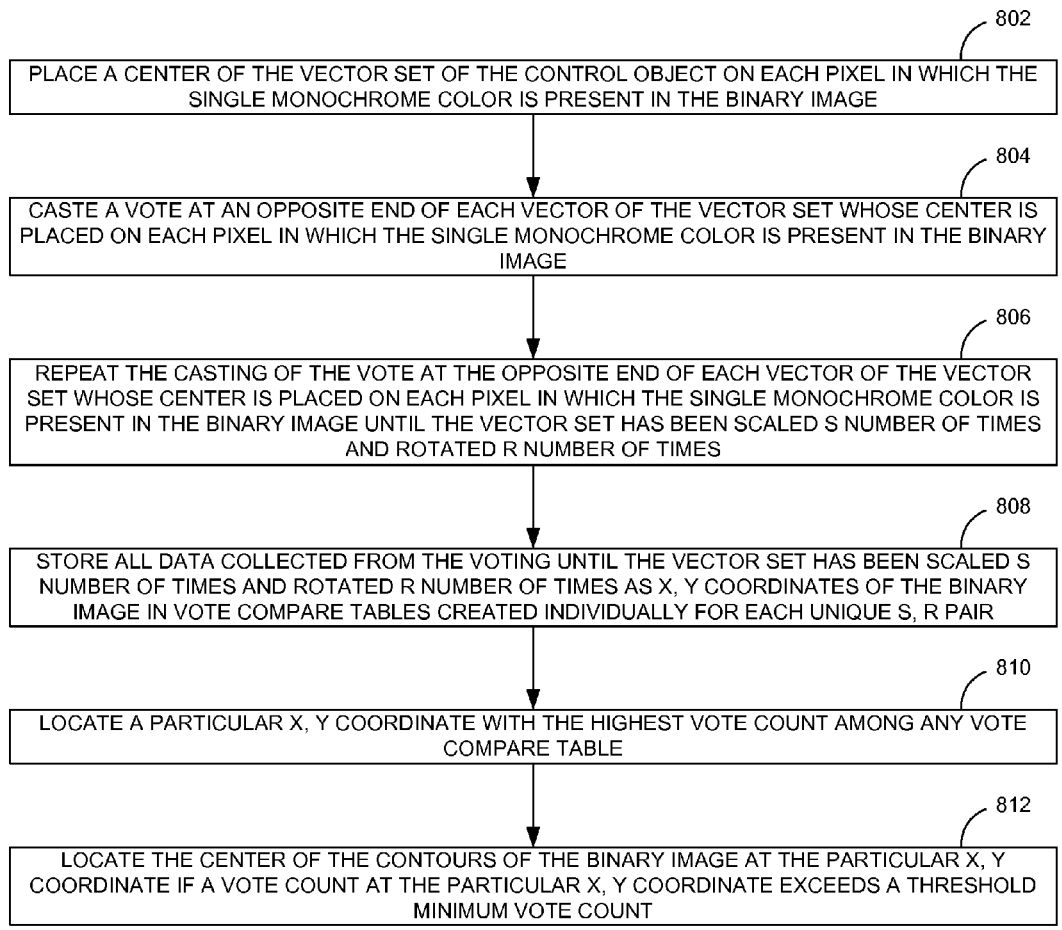
FIG. 8 is a process flow of determining a center of the contour of the binary image, according to one or more embodiments.

FIG. 8 is a process flow diagram of determining a center of the contour of the binary image 255, according to one or more embodiments. In operation 802, a center of the vector set of a control object may be placed on each pixel in which the single monochrome color is present in the binary image. In operation 804, a vote at an opposite end of each vector of the vector set may be casted whose center is placed on each pixel in which the single monochrome color is present in the binary image. In operation 806, a casting of the vote may be repeated at the opposite end of each vector of the vector set whose center is placed on each pixel in which the single monochrome color is present in the binary image until the vector set has been scaled "S" number of times and rotated "R" number of times. In operation 808, data collected from the voting may be stored until the vector set has been scaled "S" number of times and rotated "R" number of times generating vote counts at X, Y coordinates of the binary image in vote compare tables created individually for each unique S, R pair. In operation 810, a particular X, Y coordinate may be located with the highest vote count among any vote compare table. In operation 812, center of the contours of the Binary Image may be located at the particular X,Y coordinate if a vote count at the particular X, Y coordinate exceeds a threshold minimum vote count.

Although the present embodiments have been described with reference to specific example embodiments, it will be evident that various modifications and changes may be made to these embodiments without departing from the broader spirit and scope of the various embodiments. Accordingly, the specification and drawings are to be regarded in an illustrative rather than a restrictive sense.

What is claimed is:

1. A method, comprising:
capturing an image of a first organic polarized object using a camera;
collecting a first image data of the first organic polarized object;
algorithmically calculating a first dimension data of the first organic polarized object including a center and edges of the first organic polarized object using a processor;
generating a first data table of the first dimension data of the first organic polarized object; and
forming a training data set through at least one of transformation and scaling of the first data table of the first organic polarized object.

2. The method of claim 1 further comprising:
capturing a second image of a second organic polarized object using the camera;
collecting a second image data of the second organic polarized object;
algorithmically calculating a second dimension data of the second organic polarized object comprising, the center and edges of the second organic polarized object using the processor;
calculating a high vote count data using the second dimension data of the captured image of the second organic polarized object;
creating a second data table of the second dimension data of the second organic polarized object;
determining the second dimension data as a distinct data for the second organic polarized object even if the second organic polarized object is in an at least one of an adjacent, a bordering, a overlapping, an underneath to the other object and an up-side down state;
comparing the training data set to the second dimension by generating high vote count data to identify at least one of the second organic polarized object and a precise size, shape, orientation and location data of the second organic polarized object using the processor;
selecting a robotic end effector movement having an 'n' degrees of freedom of movement;
picking up the second organic polarized object using the robotic end effector in at least one of a precise location and a precise orientation; and
transporting the second organic polarized object from a first location and first orientation to a second location and second orientation in a specific tray with a slot and/or pins;
having the slot in a specific shape to receive a first end of the second organic polarized object into the slot before a second end of the second organic polarized object, such that the first end of the second organic polarized object is oriented towards a narrow base of the slot and the second end is oriented towards a broad opening of the slot.

3. The method of claim 1, wherein the dimension data is at least one of a width, a depth, a length, a distance, an intensity, a curvature, a surface area, a volume, a narrow field, a broad field, edges, center and an angle.

4. The method of claim 1 further comprising:
finding the edges of the first organic polarized object from the captured image to create the training set data.

5. The method of claim 1 further comprising correcting an angle of deposit based on the type of the slot.

6. The method of claim 5 further comprising:
depositing the organic polarized object in the precise location and orientation in a slot in the tray or onto a pin.

7. The method of claim 1, further comprising:
permitting the "n" degrees of freedom of movement is at least one of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along at least one of x, y, and z coordinate axes.

8. An organic polarized object detector system, comprising:
an image module to process an image of a first organic polarized object using a processor;
an algorithm module to calculate a dimension data from a captured image of a first and a second organic polarized object;

a training set module to store a training data set;

a calibration module to align the coordinate systems of a robotic end effector with an image capture device; and a movement module to direct the robotic end effector to perform a specific movement based on the organic polarized object dimension data at "n" degree of freedom.

9. The system of claim 8, further comprising:

a transport module to determine the 'n' degree of freedom movement for the robotic end effector;

the movement module with an aid of the training set module to allocate a next best position for the second organic polarized object on a tray; and a quality assurance module to select a specific size, characteristics and shape of the second organic polarized object based on the training set data of first organic polarized object.

10. The system of claim 9, further comprising a change module to indicate a change of tray is warranted once the tray has reached a maximum capacity to hold the organic polarized object.

11. The system of claim 8, wherein the dimension data is at least one of a width, a depth, a length, a distance, an intensity, a curvature, a surface area, a volume, a narrow field, a broad field, edges, center and an angle.

12. The system of claim 8 further comprising:

the movement module with the "n" degrees of freedom of movement is at least one of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along at least one of x, y, and z coordinate axes.

13. The system of claim 8, further comprising an alert module to indicate that a maximum threshold for depositing the second organic polarized object has been reached.

14. An organic polarized object detector apparatus, comprising:

an image capture device to record an image of at least one of a first organic polarized object and a second organic polarized object;

a data storage device to store a data set from the image capture device after a capture of the image;

a processor to calculate the "n" degree of freedom movement for a robotic end effector using a training data and organic polarized object dimension data sets;

a tray with at least one of a plurality of slots and a plurality of pins to hold the second organic polarized object at a specific coordinate; and a signal device to indicate that the tray has reached a maximum capacity and to prompt a change for another empty tray.

15. The apparatus of claim 14, further comprising:

the robotic end effector controlled by a pneumatic cylinders having a first elongated extension and a second elongated extension to hold the second organic polarized object;

the first elongated extension and the second elongated extension having a sensor device to control a closer of the first elongated extension and the second elongated extension; and a software to control the robotic end effector and "n" degrees of freedom movement for the robotic end effector.

16. The apparatus of claim 14, wherein the sensor device is at least one of a capacitive sensor, a resistive sensor and an inductive sensor.

17. The apparatus of claim 14, wherein the image capture device is at least one of an infra red device, a laser device, a camera, a biosensor, a color sensor, a heat sensor and a water sensor.

18. The apparatus of claim 14, wherein the 'n' degrees of freedom of movement is at least one of a moving up and down in heaving, a moving left and right in swaying, a moving forward and backward in surging, a tilting forward and backward in pitching, a turning left and right in yawing, a full axis motion in 360 degree rotation, a tilting side to side in rolling, and a moving along at least one of x, y, and z coordinate axes.

19. The apparatus of claim 14, wherein the dimension data is at least one of a width, a depth, a length, a distance, an intensity, a curvature, a surface area, a volume, a narrow field, a broad field, edges, center and an angle.

20. The apparatus of claim 14, wherein the tray is a part of a large automated assembly system.

* * * * *